United States Patent
Stoddard

(10) Patent No.: US 12,339,637 B2
(45) Date of Patent: Jun. 24, 2025

(54) OPTIMIZING SEMICONDUCTOR MANUFACTURING PROCESSES USING MACHINE LEARNING

(71) Applicant: Tignis, Inc., Seattle, WA (US)

(72) Inventor: Ryan Stoddard, Shoreline, WA (US)

(73) Assignee: Delta Design, Inc., Poway, CA (US)

( * ) Notice: Subject to any disclaimer, the term of this patent is extended or adjusted under 35 U.S.C. 154(b) by 0 days.

(21) Appl. No.: 18/661,276

(22) Filed: May 10, 2024

(65) Prior Publication Data

US 2024/0377802 A1 Nov. 14, 2024

Related U.S. Application Data

(60) Provisional application No. 63/501,834, filed on May 12, 2023.

(51) Int. Cl.
G05B 19/18 (2006.01)

(52) U.S. Cl.
CPC .. *G05B 19/188* (2013.01); *G05B 2219/45031* (2013.01)

(58) Field of Classification Search
CPC .............. G05B 19/188; G05B 2219/45031
See application file for complete search history.

(56) References Cited

U.S. PATENT DOCUMENTS

| | | | |
|---|---|---|---|
| 2016/0041548 A1 | 2/2016 | Chung et al. | |
| 2020/0110390 A1* | 4/2020 | Banna | G05B 19/41875 |
| 2021/0150387 A1* | 5/2021 | Rothstein | G06N 5/04 |
| 2022/0050061 A1* | 2/2022 | Bar | G03F 7/7065 |
| 2022/0374572 A1* | 11/2022 | Sawlani | G06N 20/00 |
| 2023/0091058 A1* | 3/2023 | Cantwell | G05B 13/042 700/97 |
| 2023/0135102 A1 | 5/2023 | Pack | |

OTHER PUBLICATIONS

Good, R., et al. "On the Stability of MIMO EWMA Run-To-Run Controllers With Metrology Delay", IEEE Transactions on Semiconductor Manufacturing, vol. 19, No. 1, Feb. 2006, 10 pages.
International Search Report and Written Opinion mailed Sep. 30, 2024, issued in corresponding International Application No. PCT/US2024/028971, filed May 10, 2024, 10 pages.

* cited by examiner

Primary Examiner — Christopher W Carter
(74) Attorney, Agent, or Firm — Knobbe, Martens, Olson & Bear, LLP

(57) ABSTRACT

In some embodiments, a computer-implemented method of controlling a semiconductor manufacturing process is provided. A computing system generates predicted metrology values for a current run and a next run by providing metrology forecast inputs to a metrology forecast model. The computing system generates an updated recipe for executing at least one semiconductor manufacturing process step using the predicted metrology values for the current run and the next run.

20 Claims, 12 Drawing Sheets

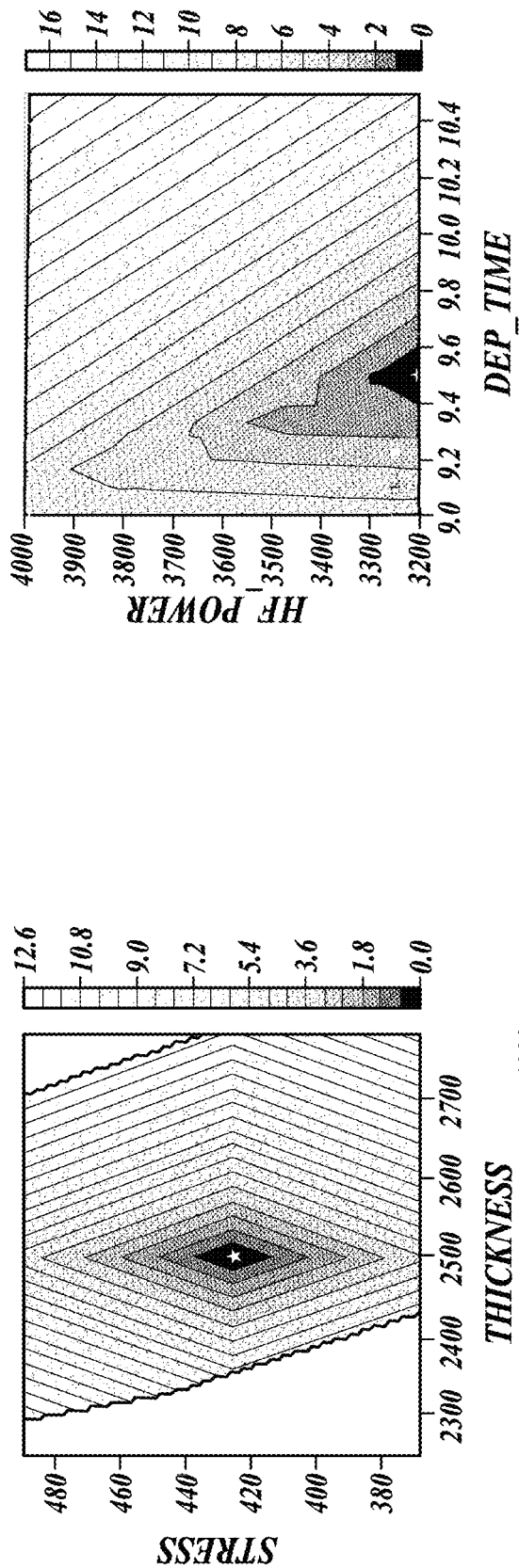
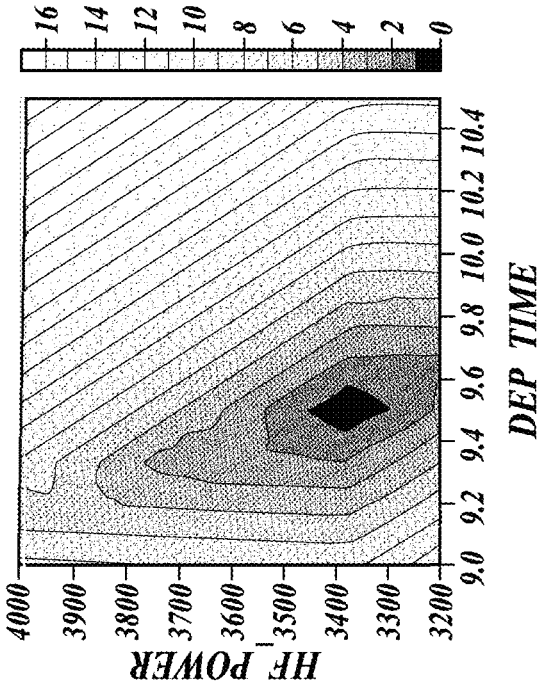
FIG. 8A
FIG. 8B
FIG. 8C

OPTIMIZING SEMICONDUCTOR MANUFACTURING PROCESSES USING MACHINE LEARNING

CROSS-REFERENCE(S) TO RELATED APPLICATION

This application claims the benefit of Provisional Application No. 63/501,834, filed May 12, 2023, the entire disclosure of which is hereby incorporated by reference herein for all purposes.

BACKGROUND

In semiconductor manufacturing, the continued advancement of devices has become a foundation of our technology-centric modern world. As node sizes continue to shrink to below what was previously thought imaginable, increasing demands are placed on the size of the acceptable output space for each process step in the semiconductor manufacturing process. Any step output parameter, including but not limited to thin film thickness, feature critical dimension size, or overlay magnitude, is increasingly subject to a tighter tolerance on the precise metric. Thus, when specific wafers or devices fail to meet these tight metrics, increased costs are realized due to higher scrap and rework rates, as well as a longer time to get a new process step in acceptable control to begin high volume production.

The increasing availability of big data combined with increased sophistication of artificial intelligence (AI) and machine learning (ML) modeling approaches has made the introduction of AI and ML to control systems in semiconductor manufacturing an attractive prospect. In theory, ML offers potential value to leverage signals in the large process datasets to better control process inputs, resulting in lower variance and increased compliance with tighter tolerances placed on process step outputs. By reducing variability in process step outputs, higher yield, lower scrap, less rework, and faster time to high volume scale manufacturing can be realized. However, using ML for control can be complex in practice, at least because inverting ML functions (solving for the inputs) inherently violates the assumptions of supervised machine learning modeling. What is desired are techniques for using machine learning in semiconductor run-to-run control that effectively utilizes complex signals extracted from available datasets in a practical and reliable manner.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of controlling a semiconductor manufacturing process is provided. A computing system generates predicted metrology values for a current run and a next run by providing metrology forecast inputs to a metrology forecast model. The computing system generates an updated recipe for executing at least one semiconductor manufacturing process step using the predicted metrology values for the current run and the next run. In some embodiments, a non-transitory computer-readable medium is provided. The computer-readable medium has computer-executable instructions stored thereon that, in response to execution by one or more processors of a computing system, cause the computing system to perform actions of such a method. In some embodiments, a computing system configured to perform actions of such a method is provided. In some embodiments, a semiconductor manufacturing system controlled by such a method is provided.

In some embodiments, a computer-implemented method of re-training a process model for predicting outcomes of a semiconductor manufacturing process is provided. A computing system obtains a previously trained process model and a training data set used to train the previously trained process model. The computing system collects a first batch of training data by selecting sampling points for input values using a pattern-based approach or a random-sampling approach. The computing system re-trains the previously trained process model using at least some data from the first batch of training data and at least some data from the training data set used to train the previously trained process model. The computing system determines an optimal set of subsequent input value sample points. The computing system collects a subsequent batch of training data using the optimal set of subsequent input value sample points. The computing system re-trains the previously trained process model using at least some data from the subsequent batch of training data. In some embodiments, a non-transitory computer-readable medium is provided. The computer-readable medium has computer-executable instructions stored thereon that, in response to execution by one or more processors of a computing system, cause the computing system to perform actions of such a method. In some embodiments, a computing system configured to perform actions of such a method is provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8A-FIG. 8C include charts that illustrate a non-limiting example embodiment of evaluation of a cost function where output costs have been defined as mean absolute error with respect to output targets, and more input dimensions are present than output dimensions.

DETAILED DESCRIPTION

Figure 1:
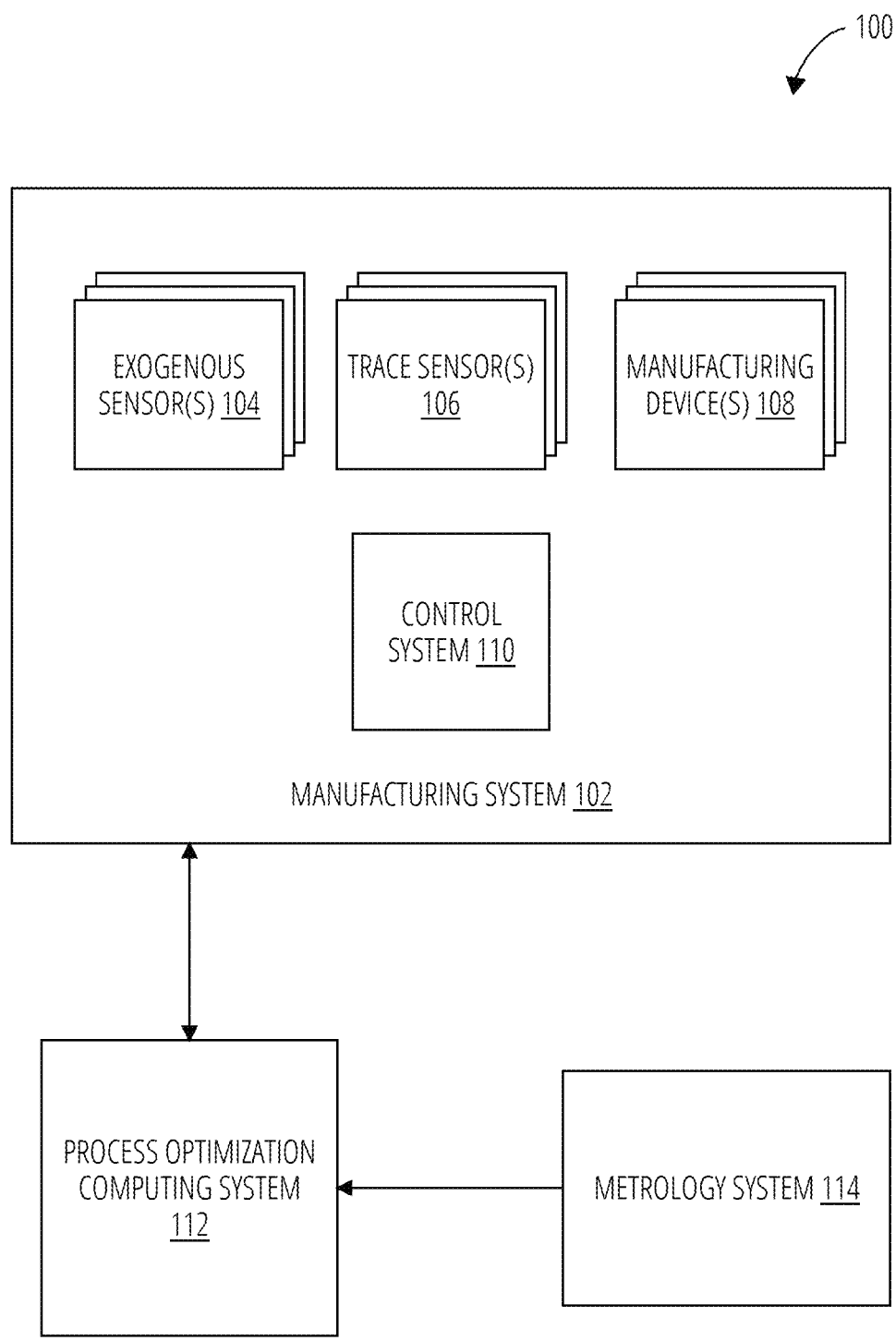
FIG. 1 is a high-level schematic illustration of a system in which a process optimization computing system is used to optimize control of a semiconductor manufacturing process, according to various aspects of the present disclosure.

FIG. 1 is a high-level schematic illustration of a system in which a process optimization computing system is used to optimize control of a semiconductor manufacturing process, according to various aspects of the present disclosure. As shown, the system 100 includes a manufacturing system 102, a process optimization computing system 112, and a metrology system 114.

In some embodiments, the manufacturing system 102 may be any system or collection of sub-systems that perform a manufacturing process such as a semiconductor manufacturing process. The manufacturing system 102 includes one or more manufacturing devices 108 that perform the physical steps of the manufacturing process, as well as a control system 110 that provides control inputs to the manufacturing devices 108. In a semiconductor manufacturing process, some examples of manufacturing devices 108 may include, but are not limited to, a thin film deposition device, a photolithography device, an etching device, an overlay correction device, and a chemical mechanical planarization device. Some examples of semiconductor manufacturing process steps performed by such devices include, but are not limited to, thin film deposition, photolithography, etching, overlay correction, and chemical mechanical planarization.

During operation of the manufacturing devices 108, one or more exogenous sensors 104 and one or more trace sensors 106 generate data that may be transmitted to and consumed by the process optimization computing system 112. In some embodiments, the trace sensors 106 may include one or more sensors that measure characteristics of a manufacturing device 108 or an action performed by a manufacturing device 108. Examples of characteristics measured by trace sensors 106 include, but are not limited to, one or more of heating element zone temperatures; mass flow rates of inlet and/or exhaust gas streams; chamber pressures; power supply currents, voltages, powers, and/or frequencies; or optical emission spectroscopy wavelength bands of exhaust streams. In some embodiments, the exogenous sensors 104 may include one or more sensors that measure characteristics of the environment in which the manufacturing devices 108 are operating that may affect the condition of an output of the manufacturing devices 108 for one reason or another. Examples of characteristics that may be measured by the exogenous sensor 104 include, but are not limited to, one or more of a timestamp of an action taken by a manufacturing device 108, an ambient temperature, or a relative humidity. In some embodiments, apriori values may also be collected and reported by the exogenous sensors 104 and/or the trace sensors 106. Examples of apriori values may include, but are not limited to, one or more of a wafer number, a chamber accumulation counter value, a hot plate identifier, and a measurement value from a previous process step.

Once the manufacturing devices 108 perform one or more steps on an input (e.g., a wafer), the metrology system 114 may measure an output of the manufacturing devices 108 (e.g., an output wafer) to analyze the accuracy of the operations performed by the manufacturing devices 108. The metrology system 114 may generate one or more measured metrology values based on the output, including but not limited to one or more of a thickness, a stress, a refractive index, a sidewall angle, and an etch critical dimension. The measured metrology values may then be provided to the process optimization computing system 112 to update a recipe based on differences between the measured metrology values and desired values.

Figure 2:
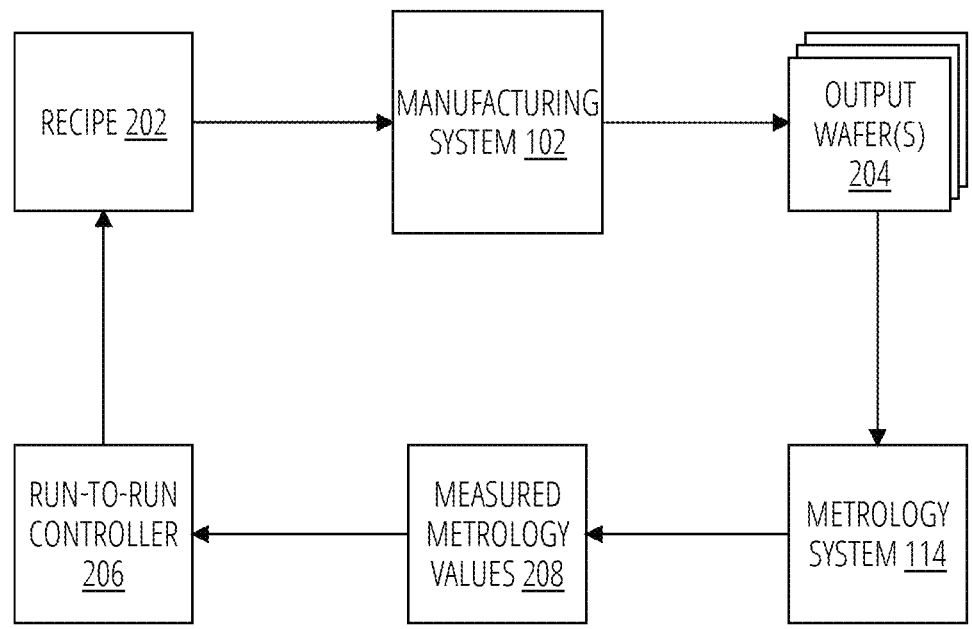
FIG. 2 is a schematic illustration of a traditional run-to-run process control technique.

Automation has previously been employed in run-to-run process control for semiconductor manufacturing processes such as these. FIG. 2 is a schematic illustration of a traditional run-to-run process control technique. A recipe 202 for processing a wafer in a semiconductor manufacturing process is provided that includes input values, device settings, and/or other information for controlling one or more steps of the semiconductor manufacturing process. Based on the recipe 202, commands are provided to a manufacturing system 102, which performs one or more manufacturing steps to produce an output wafer 204. The output wafer 204 is then processed using a metrology system 114 to determine measured metrology values 208 that represent characteristics of the output wafer 204. The measured metrology values 208 may be compared to desired values, with the differences being used by a legacy run-to-run controller 206 provided by the process optimization computing system 112 to adjust the recipe 202 for a subsequent run.

Various simple techniques have previously been used by the run-to-run controller 206. In a technique referred to as advanced process control (APC), a process model is learned, then used by the run-to-run controller 206 to automatically update the recipe 202 with an exponentially-weighted moving average (EWMA) update. This solution can yield better performance than a naïve (no control) baseline. However, we are now in an age where more and more data is collected from process equipment, and the generation of measured metrology values 208 by the metrology system 114 can take an amount of time that is impractical to incorporate into the run-to-run timeframe. The classic APC based on EWMA is too simplistic to leverage any of the signals collected from process equipment, and the reliance on post-processed measured metrology values 208 thus can only account for drift and process changes well after they have already occurred. These techniques are therefore often insufficient to meet current demands of leading-edge semiconductor manufacturing.

Some improvements to the classic APC method have been suggested, for example, using cross-validation (a strategy borrowed from machine learning) to dynamically set the update hyperparameters for the process model. While this may lead to minor improvements over the classic baseline, it fundamentally omits the power of machine learning to create a metrology forecast model and/or an actor model that leverage complex and important signals in our techniques.

Another strategy has been to use a machine learning model that generates last run predictions to predict metrology results, then take the inverse of this model to determine input settings/changes to the recipe 202, or for the simpler situation of overlay prediction where there is no process model. However, the more complex model architectures required for accurate virtual metrology prediction that have previously been proposed do not have reliable performance when computing the inverse. Indeed, the inverse result often falls well outside the data distribution with which the model was trained on, which violates reliability assumptions for supervised learning models. Thus, in practice these approaches perform worse than the classic APC approaches described above. What is desired are techniques for applying machine learning techniques to improve the performance of semiconductor manufacturing processes that have the speed to be executed on a run-to-run basis (i.e., that do not have to wait for processing of the output wafer 204 by the metrology system 114) but that can also handle the complexity of sensor data created during modern semiconductor manufacturing processes.

In embodiments of the present disclosure, a process model, a metrology forecast model, and an actor model are combined in order to provide run-to-run optimization of recipes for semiconductor manufacturing processes. The process model is trained to learn a relationship between inputs provided by the recipe 202 and outputs generated by the manufacturing systems 102. The metrology forecast model is trained to predict a likely metrology outcome of the manufacturing systems 102 based on the recipe 202 and complex sensor data received during the process. The actor model combines at least predictions from the metrology forecast model and the process model to provide an optimized recipe for the next run.

These techniques simultaneously allow the leveraging of complex signals in rich data streams (using the metrology forecast model) while proposing updates to recipes in a reliable way (using a process model that is reliably invertible), while also satisfying complex cost functions defined by a domain expert (using the actor model). The combination of these components helps provide superior performance compared to previous techniques.

Figure 3:
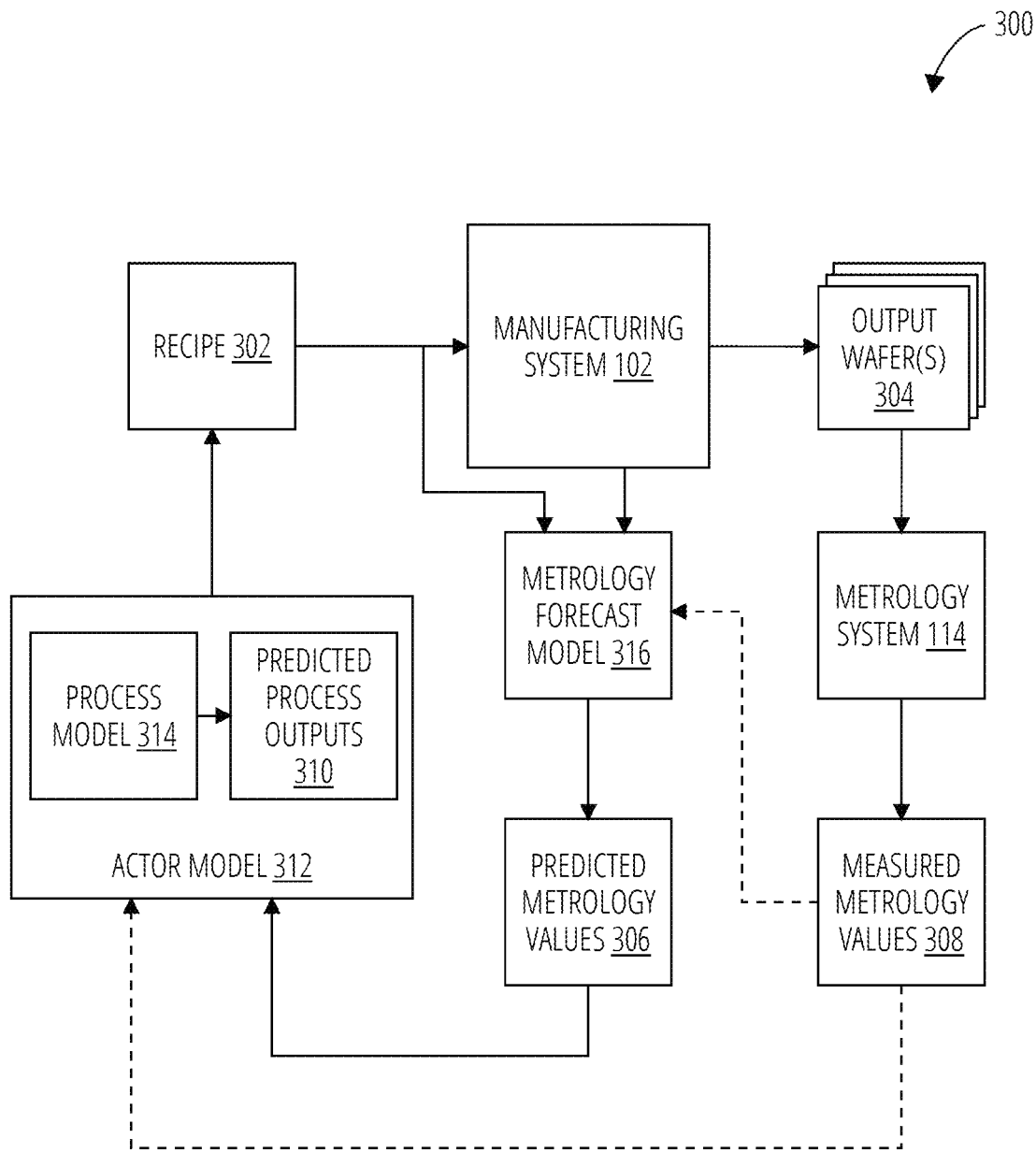
FIG. 3 is a schematic illustration of a system that provides improved run-to-run control of a semiconductor manufacturing process according to various aspects of the present disclosure.

FIG. 3 is a schematic illustration of a system that provides improved run-to-run control of a semiconductor manufacturing process according to various aspects of the present disclosure. Similar to the traditional technique illustrated in FIG. 2, commands based on a recipe 302 are provided to a manufacturing system 102 to perform a run of the manufacturing process.

As shown, the recipe 302 is used to determine a set of process inputs for the manufacturing system 102. The set of process inputs includes one or more settings for one or more manufacturing devices 108 of the manufacturing system 102, and may include values including, but not limited to, one or more of a deposition time, an amount of power (e.g., high frequency (HF) power), an argon flow, a pedestal gap, a dosing, an etch time, or an etch gas flow. The set of process inputs are provided to the manufacturing system 102 to control the manufacturing devices 108, and the manufacturing system 102 produces an output wafer 304, which is examined using a metrology system 114 to produce measured metrology values 308, similar to the traditional techniques illustrated in FIG. 2. However, in the system 300, the inputs are also provided to a metrology forecast model 316.

In some embodiments, the metrology forecast model 316 is configured to utilize all available information known at the time a recipe 302 is being updated to make the best possible prediction of the predicted metrology values 306, including both values known in advance (apriori values) and values not known until they are reported during or after the run (information provided by trace sensors 106 and/or exogenous sensors 104). In some embodiments, the metrology forecast model 316 may also use any available measured metrology values 308 for the current run, and/or from previous runs.

In some embodiments, the metrology forecast model 316 uses information from a current run to determine predicted metrology values 306 for the current run and a next run (i.e., the run for which the recipe 302 is being optimized). In some embodiments, the metrology forecast model 316 incorporates many different values into its prediction, including but not limited to one or more of the process inputs, trace statistic values, exogenous values, apriori values, and/or measured metrology values.

In some embodiments, the process inputs used by the metrology forecast model 316 are the actual values of control inputs that were based on the recipe 302 and provided to the manufacturing system 102. Typically, the process inputs closely match the recipe 302, though sometimes are not precisely the same as values provided in the recipe 302.

In some embodiments, trace statistic values used by the metrology forecast model 316 may include features extracted from data received from the trace sensors 106. As a non-limiting example, the trace sensors 106 may include a temperature sensor associated with a hot plate of a manufacturing device 108, and the temperature sensor may report a time series of values labeled as "hot plate temperature." The data collection engine 618 may record the time series of values from this sensor for the processing of a given wafer, and this time series of values may be referred to as a "trace." A trace statistic value may include a metric, including but not limited to a scalar metric, that may be extracted from the trace, including but not limited to a mean or standard deviation of the trace. In some embodiments, a trace statistic value may include latent dimensions extracted from a deep neural network autoencoder used to process the trace.

In some embodiments, exogenous values are other, non-trace variables that are provided by exogenous sensors 104 or obtained from other sources, including but not limited to one or more of a timestamp associated with a start, end, or other point of a run; an ambient temperature during the run; a relative humidity at the start of the run; and/or other measurable states that may affect the performance of the manufacturing system 102.

In some embodiments, the apriori values may include one or more values that are known before the run begins that may affect the performance of the manufacturing system 102. The apriori values may include, but are not limited to, one or more of a wafer number, a value of a chamber accumulation counter, an identifier of a hot plate assigned to a process step, and/or an available measurement from a previous process step.

Any suitable architecture may be used for the metrology forecast model 316, including but not limited to deep neural networks, random forests, kernel-based methods, and/or support vector machines. In some embodiments, the metrology forecast model 316 may be trained using a marathon-style dataset. In some embodiments, an operating point learned by the process model 314 may be used as a baseline recipe, and this baseline recipe may be repeated for many runs to build up a marathon dataset. In some embodiments, a traditional APC controller may be deployed using the process model 314, and the metrology forecast model 316 may be trained once enough runs have occurred to provide an adequate marathon dataset. In each case, the metrology forecast model 316 is trained to generate predicted metrology values 306 for both a current run and a next run. In some embodiments, for generating the predicted metrology values 306 for the current run, the metrology forecast model 316 may use one or more of the process inputs, the trace statistic values, the exogenous values, and/or the apriori values for the current run, along with any available measured metrology values 308 for the current run and/or for previous runs. In some embodiments, for generating the predicted metrology values 306 for the next run, the metrology forecast model 316 may use one or more of the process inputs, the trace statistic values, the exogenous values, and/or any available measured metrology values 308 for the current run and/or previous runs, along with apriori values for the next run.

Figure 4A:
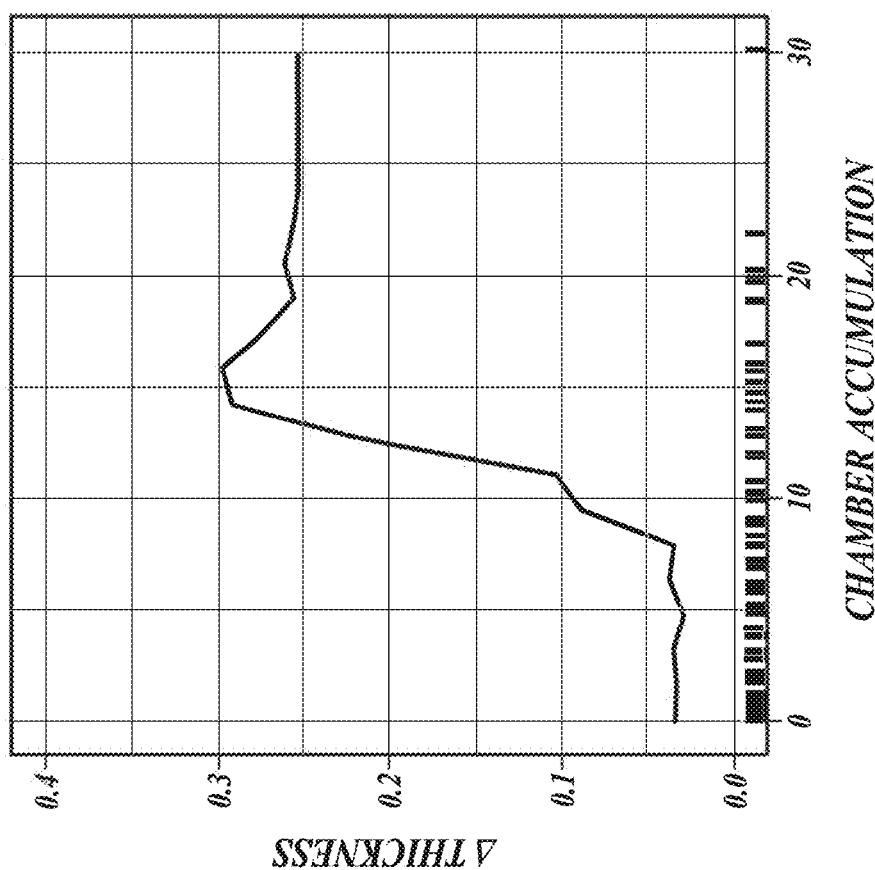
FIG. 4A is a non-limiting example of a SHAP plot that presents an analysis of a metrology forecast model according to various aspects of the present disclosure.
Figure 4B:
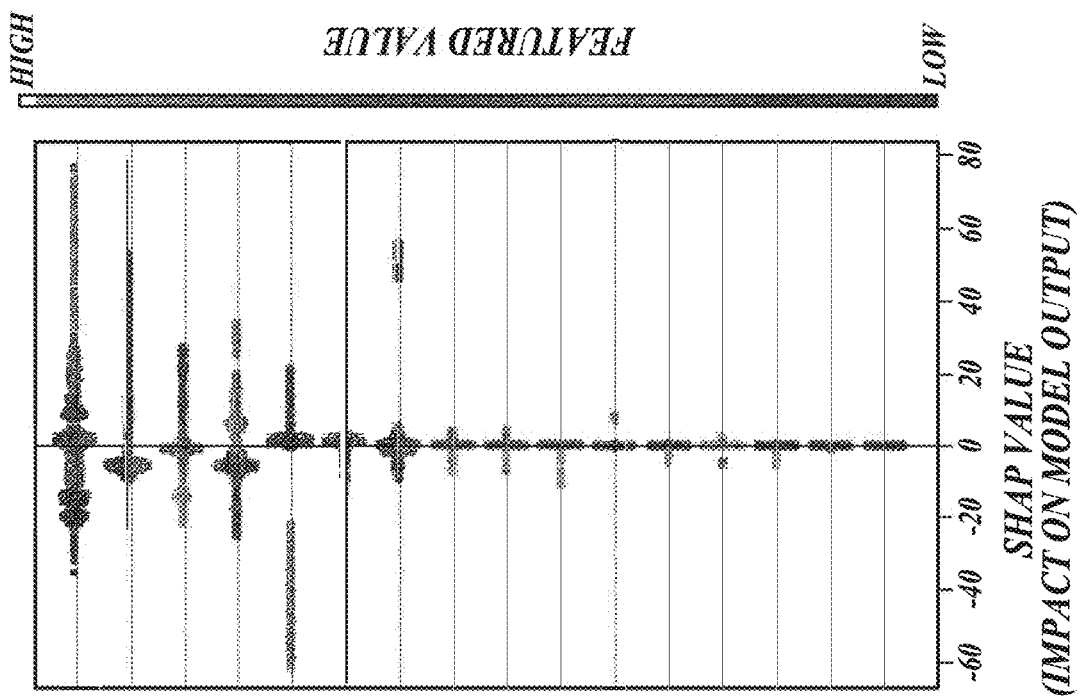
FIG. 4B is a non-limiting example of a chart that plots a partial dependence of output thickness on chamber accumulation.

In some embodiments, relationships learned by the metrology forecast model 316 may be analyzed using standard machine learning model interpretability tools in order to determine relationships between its inputs and the predicted metrology values 306. For example, a SHAP (SHapley Additive exPlanations) framework may be applied to the metrology forecast model 316 to find such relationships. FIG. 4A is a non-limiting example of a SHAP plot that presents an analysis of a metrology forecast model 316 according to various aspects of the present disclosure. The SHAP plot of FIG. 4A demonstrates Shapley values for several features in a non-limiting example of a metrology forecast model 316 for an etch process. Each separate feature is provided on the vertical axis. Each point in the plot represents a sample, and the SHAP value represents an importance of that feature on the predicted metrology values 306 for that sample. FIG. 4B is a non-limiting example of a chart that plots a partial dependence of output thickness on chamber accumulation. This may be a particularly important apriori value in a chemical vapor deposition process, as buildup of material on the chamber walls changes the deposition rate, thus suggesting different process inputs (e.g., longer deposition time) to maintain constant thickness output. This precise quantitative relationship may be learned by the metrology forecast model 316, and the metrology forecast model 316 may pass this information on in its predicted metrology values 306 for use by the actor model 312.

The predicted metrology values 306, and, if available, the measured metrology values 308, are then provided to an actor model 312. The actor model 312 ingests these values and, along with one or more of a cost function preference, an output target setpoint, and a process model 314, returns an optimized recipe 302 to be used in the next run. The actor model 312, process model 314, and metrology forecast model 316 may be updated periodically using various retraining techniques.

The process model 314 is configured to generate predicted process outputs 310 based on a set of process inputs, either process inputs derived from the recipe 302, or updated process inputs generated by the actor model 312 and provided to the process model 314 for evaluation. In some embodiments, the process model 314 is trained to determine a quantitative relationship between process inputs (e.g., one or more of deposition time, high frequency (HF) power, argon flow, pedestal gap, dosing, etch time, etch gas flows, etc.) and characteristics of output wafers 304 (e.g., thickness, stress, refractive index, etch critical dimension, etc.) from training data. The process model 314 generates information based on these learned relationships as output, which may be consumed by the actor model 312 as a basis for decisions regarding adjustments to be made to the recipe 302.

In some embodiments, the process model 314 is trained using a training data set that includes sufficient independent variance in all of the input dimensions. To obtain such a training data set, a process characterization run list having runs designed to obtain data having these characteristics may be used. The process characterization run list may be created using any suitable technique. In some embodiments, the process characterization run list may be created using design of experiment response surface methods, including but not limited to one or more of a Box-Behnken design or a central composite design. In some embodiments, the process model 314 may be trained using a second-degree polynomial statistical model on the training set created by executing the process characterization run list generated using the response surface method. In some embodiments, instead of newly executing a process characterization run list, an historical dataset with sufficient independent variance in all input dimensions may be extracted from records of previous runs to create the training data set.

In some embodiments, the process model 314 may be highly regularized and have predictable behavior when calculating the inverse. In some embodiments, these characteristics are obtained by linearizing the process model 314 about the operating point in the input space. The actor model 312 may then use this linearized process model 314 to take steps in the input space that keep the process outputs in a desirable range. The process model 314 establishes a relationship between the process inputs and each process output; so, for a four input and three output control scheme, the process model will make a prediction for each of the three output dimensions within the entire four dimensional input space.

Figure 5B:
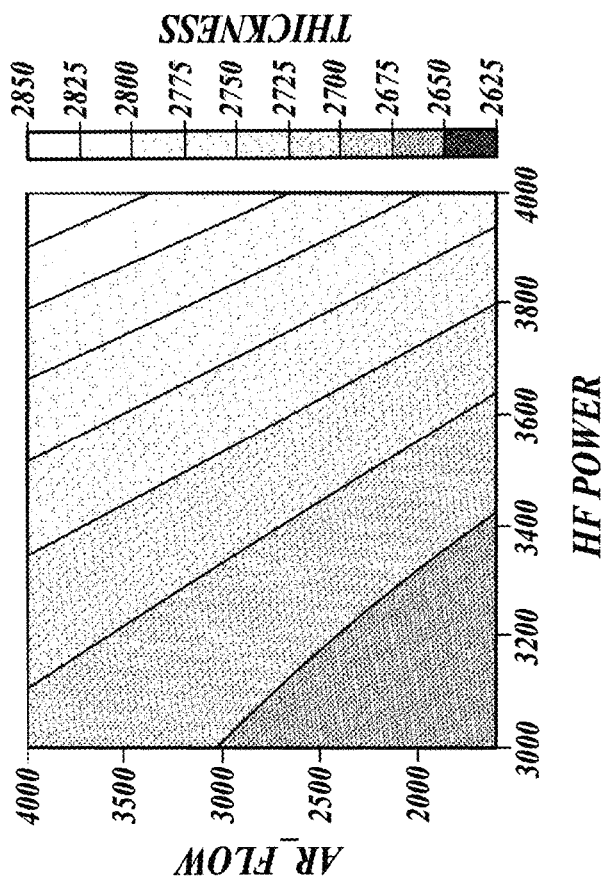
FIG. 5A and FIG. 5B illustrate an example relationship determined by training a process model on an appropriate training set.
Figure 5A:
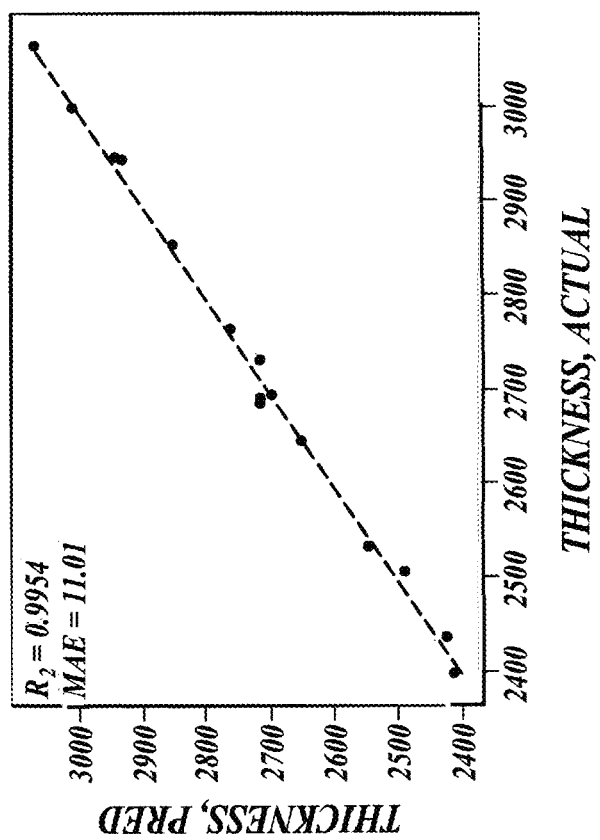

A non-limiting example relationship determined by training the process model 314 on an appropriate training set is shown in FIG. 5A and FIG. 5B. The illustrated output characteristic is a thickness. The predicted vs. actual plot in FIG. 5A quantifies the ability of the process model 314 to describe the variance in output space for that output. The surface plot in FIG. 5B demonstrates the quantitative prediction learned for how the thickness depends on two process inputs (HF power and argon flow) while other process inputs are held constant. The quantitative relationships learned by the process model are utilized to make control decisions by the actor model 312.

As used in the description of FIG. 3 and elsewhere in the disclosure, a "run" is a collection of actions between providing commands based on the recipe 302 to the manufacturing system 102 and a point when the recipe 302 is updated. In some embodiments, a run may be an execution of the manufacturing process to create a single output wafer 304. In some embodiments, a run may be multiple executions of the manufacturing process to produce a batch or numbered lot of output wafers 304. In some embodiments, a run may be based on a time period. For example, all of the manufacturing steps performed to create output wafers 304 during the given time period, such as a day, may be considered a run. Further, though an entire semiconductor manufacturing process for creating an output wafer 304 is primarily described herein, one will recognize that in some embodiments, the actions performed by the manufacturing system 102 in response to the recipe 302 may be a subset of an overall semiconductor manufacturing process, and the output wafer 304 may be an intermediate product generated during the overall semiconductor manufacturing process. Also, though a single recipe 302 is illustrated in the system 300, in some embodiments in which multiple output wafers 304 are created during a run, the recipe 302 may include different values for two or more of the output wafers 304 to be created during the run.

In some embodiments, regardless of the size of the run, the data processing illustrated in FIG. 3 may be combined for the entire run. For example, if the size of a run is a predetermined number of output wafers 304 (i.e., a numbered lot or a batch), then the recipe 302 will be used to create each of the predetermined number of output wafer 304, and the measured metrology values 308 and predicted metrology values 306 will be combined and provided to the actor model 312 to adjust the recipe 302 for the next batch of wafers. In some embodiments, only a subset of the data generated during the run may be used to update the recipe 302. For example, if a plurality of output wafers 304 are generated during the run, then data generated while creating one or more of the last output wafers 304 during the run may be provided to the actor model 312, since the later-processed output wafers 304 are more likely to represent a current state of the manufacturing system 102 than earlier-processed output wafers 304. In some embodiments, the size of a run may be variable, in that the predicted metrology values 306 may be used to detect when the recipe 302 is no longer causing the manufacturing system 102 to produce output wafers 304 within acceptable tolerance ranges, and thereby determine when a run should be stopped in order to update the recipe 302.

Accordingly, one benefit of the techniques described herein is that by generating predicted metrology values 306 and predicted process outputs 310, and having the actor model 312 use this information to update the recipe 302, different run lengths may be processed by the system 300 because the system 300 is not required to wait for the generation of measured metrology values 308. Accordingly, both very short (e.g., one output wafer 304) and very long (e.g., multiple numbered lots of output wafers 304) runs may be processed using the same techniques.

Figure 6:
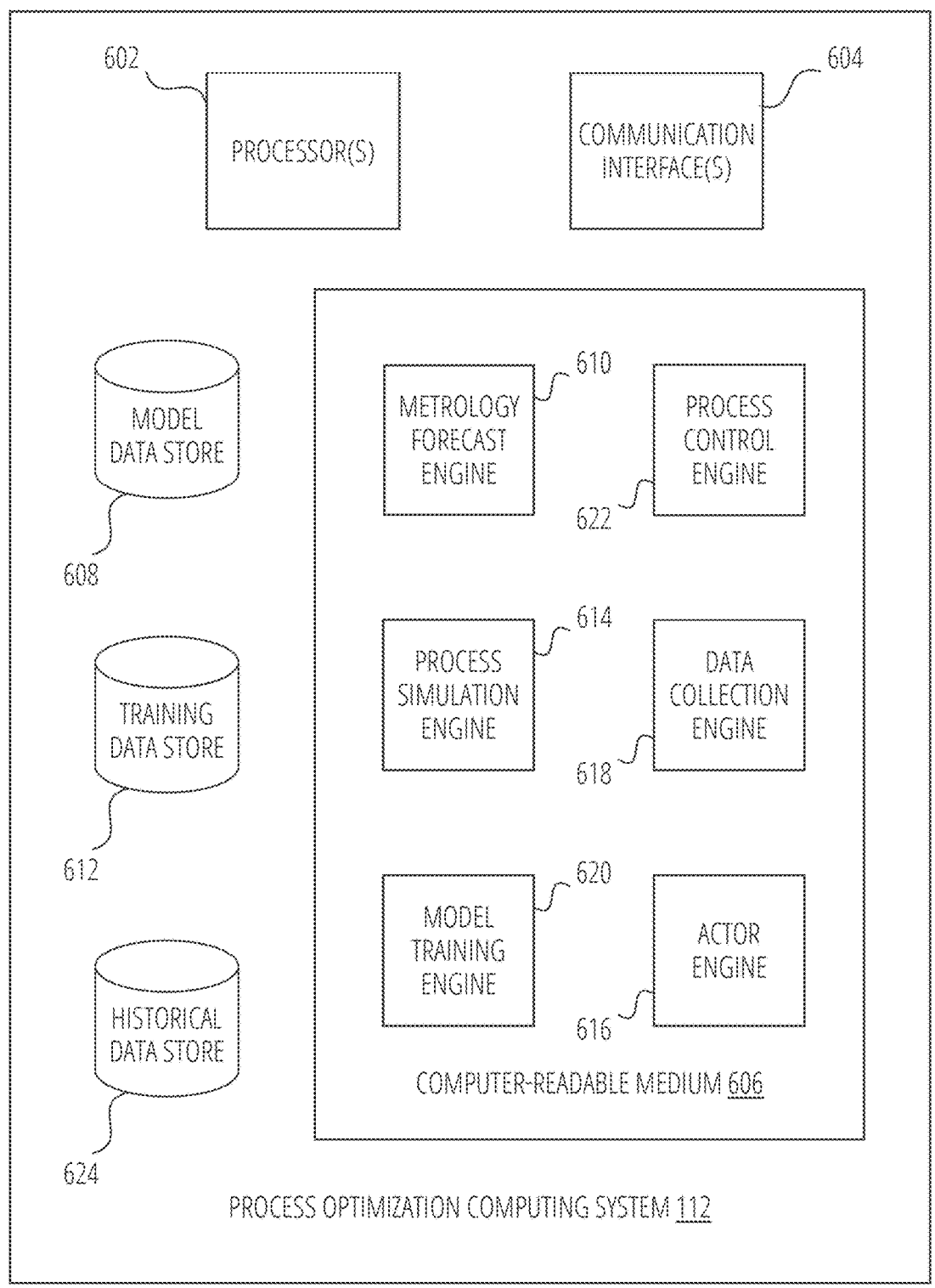
FIG. 6 is a block diagram that illustrates aspects of a non-limiting example embodiment of a process optimization computing system according to various aspects of the present disclosure.

FIG. 6 is a block diagram that illustrates aspects of a non-limiting example embodiment of a process optimization computing system according to various aspects of the present disclosure. The illustrated process optimization computing system 112 may be implemented by any computing device or collection of computing devices, including but not limited to a desktop computing device, a laptop computing device, a mobile computing device, a server computing device, a computing device of a cloud computing system, and/or combinations thereof. The process optimization computing system 112 is configured to receive recipe and sensor information, and to use the information to provide run-to-run optimization of a semiconductor manufacturing process.

As shown, the process optimization computing system 112 includes one or more processors 602, one or more communication interfaces 604, a model data store 608, a training data store 612, a historical data store 624, and a computer-readable medium 606.

In some embodiments, the processors 602 may include any suitable type of general-purpose computer processor. In some embodiments, the processors 602 may include one or more special-purpose computer processors or AI accelerators optimized for specific computing tasks, including but not limited to graphical processing units (GPUs), vision processing units (VPUs), and tensor processing units (TPUs).

In some embodiments, the communication interfaces 604 include one or more hardware and or software interfaces suitable for providing communication links between components. The communication interfaces 604 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 606 has stored thereon logic that, in response to execution by the one or more processors 602, cause the process optimization computing system 112 to provide a metrology forecast engine 610, a process control engine 622, a process simulation engine 614, a data collection engine 618, a model training engine 620, and an actor engine 616.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the process control engine 622 is configured to transmit the set of process inputs to the manufacturing system 102 in order to cause the manufacturing system 102 to perform the manufacturing process. In some embodiments, the data collection engine 618 is configured to receive data from the exogenous sensors 104 and trace sensors 106 of the manufacturing system 102, and, potentially, the measured metrology values 308 from the metrology system 114. In some embodiments, the data collection engine 618 may store at least some of the received information in the training data store 612 and/or the historical data store 624. In some embodiments, the model training engine 620 is configured to use the information from the training data store 612 to train (and/or re-train) the metrology forecast model 316, the process model 314, and/or the actor model 312.

In some embodiments, the metrology forecast engine 610 is configured to provide the set of process inputs and the data from the manufacturing system 102 (and, optionally, the measured metrology values 308) to the metrology forecast model 316 to generate predicted metrology values 306.

In some embodiments, the process simulation engine 614 is configured to provide a set of process inputs to the process model 314 to generate predicted process outputs 310.

In some embodiments, the actor engine 616 is configured to receive at least the predicted metrology values 306 from the metrology forecast engine 610, and to determine adjustments to the recipe 302 that will bring measurements of the output of the next run closer to the desired measurements using the process model 314 and its predicted process outputs 310. In some embodiments, the actor engine 616 also uses measured metrology values 308 for at least some of the output wafers 304, if available at the point in time when an updated recipe 302 is desired.

Further description of the configuration of each of these components is provided below.

As used herein, "engine" refers to logic embodied in hardware or software instructions, which can be written in one or more programming languages, including but not limited to C, C++, C#, COBOL, JAVA™, PUP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 7:
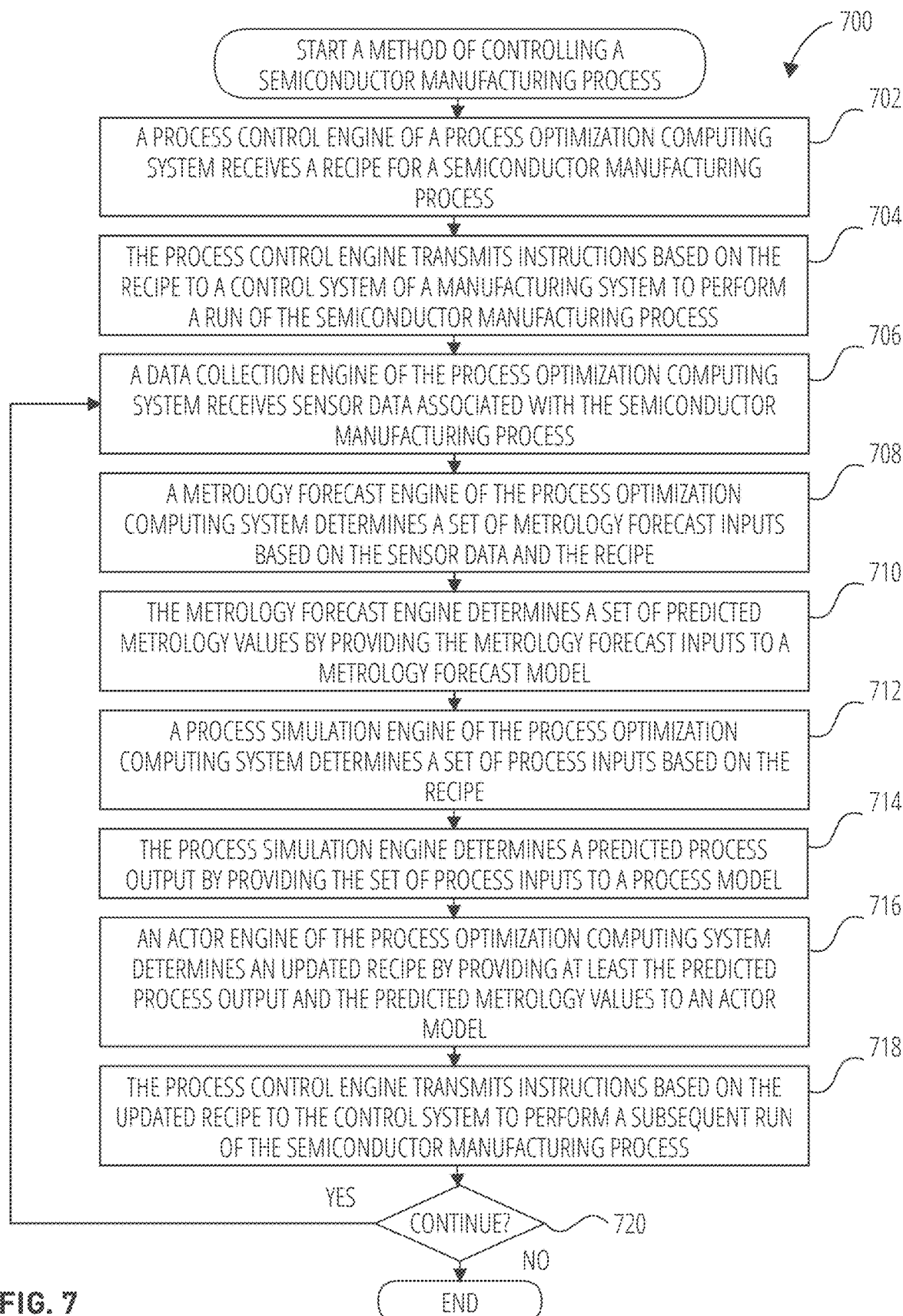
FIG. 7 is a flowchart that illustrates a non-limiting example embodiment of a method of controlling a semiconductor manufacturing process according to various aspects of the present disclosure.

FIG. 7 is a flowchart that illustrates a non-limiting example embodiment of a method of controlling a semiconductor manufacturing process according to various aspects of the present disclosure. The method 700 provides further details regarding the implementation of the data flow illustrated in FIG. 3.

From a start block, the method 700 proceeds to block 702, where a process control engine 622 of a process optimization computing system 112 receives a recipe 302 for a semiconductor manufacturing process. In some embodiments, the recipe 302 includes one or more process inputs (e.g., deposition time, HF power, argon flow, pedestal gap, dosing, etch time, etch gas flows, etc.) that may be used to determine settings for one or more manufacturing devices 108 of the manufacturing system 102. In some embodiments, the recipe 302 may specify one or more steps, and the process inputs may be specified separately for each step. In some embodiments, the recipe 302 may provide sets of different process inputs for two or more wafers to be processed in a given run. In some embodiments, the recipe 302 may also include target output values which may be used to check that the output wafer 304 meets one or more design goals (e.g., physical characteristics of the output wafer 304 being within desired tolerances).

At block 704, the process control engine 622 transmits instructions based on the recipe to a control system 110 of a manufacturing system 102 to perform a run of the semiconductor manufacturing process. In some embodiments, the control system 110 receives the instructions, and determines control signals to be transmitted to appropriate manufacturing devices 108 based on the instructions. The instructions cause the manufacturing devices 108 to be configured with the process inputs based on the recipe 302, and to execute the process steps to create one or more output wafers 304.

At block 706, a data collection engine 618 of the process optimization computing system 112 receives sensor data associated with the semiconductor manufacturing process. In some embodiments, the sensor data includes time series data received from the trace sensors 106 and the exogenous sensors 104 of the manufacturing system 102. In some embodiments, the data collection engine 618 may also receive apriori data as part of the sensor data, either from the manufacturing system 102 or from any other data source.

At block 708, a metrology forecast engine 610 of the process optimization computing system 112 determines a set of metrology forecast inputs based on the sensor data and the recipe 302. In some embodiments, the metrology forecast engine 610 may use the sensor data (e.g., the time series data from the trace sensors 106 and the exogenous sensor 104, the apriori data, etc.) directly as metrology forecast inputs. In some embodiments, the metrology forecast engine 610 may use the sensor data to derive one or more metrology forecast inputs. For example, the metrology forecast engine 610 may calculate one or more trace statistic values based on the time series data from the trace sensors 106, and may use the trace statistic values as metrology forecast inputs instead of (or in addition to) the time series data. In some embodiments, the metrology forecast engine 610 may determine whether any predicted metrology values 306 have been generated for the run, and may include them as additional metrology forecast inputs.

At block 710, the metrology forecast engine 610 determines a set of predicted metrology values 306 by providing the metrology forecast inputs to a metrology forecast model 316. In some embodiments, the metrology forecast engine 610 may retrieve the metrology forecast model 316 from the model data store 608. As discussed above, the set of predicted metrology values 306 may include values for the current run and the next run (the run for which the recipe 302 is being optimized by the method 700).

At block 712, a process simulation engine 614 of the process optimization computing system 112 determines a set of process inputs based on the recipe. In some embodiments, the process simulation engine 614 may perform similar actions as those performed in block 704 to determine the set of process inputs based on the recipe 302. In some embodiments, the process simulation engine 614 may simply receive the set of process inputs that are determined by the process control engine 622 to ensure that they are identical to the process inputs provided to the manufacturing system 102.

At block 714, the process simulation engine 614 determines a predicted process output 310 by providing the set of process inputs to a process model 314. As discussed above, the process model 314 may use learned quantitative relationships between process inputs and characteristics of output wafers 304 to determine the predicted process output 310. In some embodiments, instead of directly determining predicted process outputs 310, the quantitative relationships learned by the process model 314 (or gradients of representations of the quantitative relationships) may be used directly by the actor engine 616 to explore effects of adjusting the set of process inputs.

At block 716, an actor engine 616 of the process optimization computing system 112 determines an updated recipe by providing at least the predicted metrology values 306 to an actor model 312. In some embodiments, the actor model 312 uses the process model 314 to generate predicted process outputs 310 (and/or uses the quantitative relationships between the set of process inputs and the output wafers 304 determined by the process model 314), and uses the predicted process outputs 310 along with the predicted metrology values 306 for the current run and the next run to generate the updated recipe 302 to be used in the next run. In such embodiments, the actions illustrated in block 712 and block 714 may be performed by the actor engine 616 along with execution of the actor model 312.

In some embodiments, the actor model 312 includes a cost function that encodes preferences for operation of the manufacturing system 102. One non-limiting example of a cost function may include a mean absolute error of a value of one or more predicted process outputs 310 or one or more predicted metrology values 306 around corresponding target values. Such a cost function gives an optimum value of zero cost when every predicted process output 310 and/or predicted metrology value 306 is precisely at the corresponding target value, and gives a linear response to errors when a predicted process output 310 or a predicted metrology value 306 moves away from its corresponding target value. This type of cost function is a non-limiting example only, and in other embodiments, any other cost function shape may be used to fit preferences for operation of the manufacturing system 102. In situations in which there are more process inputs than predicted process outputs 310 or predicted metrology values 306, cost functions may additionally be defined on input dimensions to serve as a tiebreaker between process input combinations that otherwise satisfy the outputs.

In some embodiments, once a cost function is defined, the process model 314 may be used to evaluate the cost function throughout the allowed input manifold (i.e., the set of valid values for each of the process inputs). FIG. 8A-FIG. 8C include charts that illustrate a non-limiting example embodiment of this type of evaluation, where output costs have been defined as mean absolute error with respect to output targets, and more input dimensions are present than output dimensions. FIG. 8A shows a cost surface in output space; the dashed lines indicate upper and lower control limits for each output and the star indicates the point where both output targets are met. The white outer region indicates output combinations that cannot be obtained given bounded input limits enforced on the system. FIG. 8B and FIG. 8C show the cost function surface as a function of two inputs (HF power and deposition time) at two different values of a third input (pedestal gap=0.26 and 0.25 respectively). This shows that for the two different levels of pedestal gap, equally good values of the cost function may be obtained (that is, the output targets can be met with both values of the pedestal gap). One example solution to this underspecified problem is additionally adding input costs to the cost function. In the case illustrated in FIG. 8B and FIG. 8C, a mean absolute error cost around the center of each input allowable range would choose the input combination furthest away from input limits that satisfies the output targets. In some embodiments, cost functions may also include a drift penalty (penalize large steps in input space from last run) as well as complex functions of more than one input (penalize undesired combinations of inputs to avoid known poor operational regimes).

Once the cost function is specified, the actor model 312 uses the cost function to determine how the recipe 302 should be adjusted for the next run. In some embodiments, different schemes may be used if measured metrology values 308 are available or not. If measured metrology values 308 for the current run (y.) are known, then the actor model 312 may use the following scheme:

$$b = \mathrm{argmin}_b(A(x) + M_+^-(x, z, w, y) + b - y_-)$$

$$b_+ = b_-(1 - \alpha_{hm}) + b\alpha_{hm}$$

Otherwise, if measured metrology values 308 for the current run are not known, the actor model 312 may use the following scheme:

$$y_- = M_-^+(x, z, w, y)$$

$$b_0 = \mathrm{argmin}_b(A(x) + M_-^+(x, z, w, y) + b - y_-)$$

$$b_+ = b_-(1 - \alpha_{sm}) + b_0\alpha_{sm}$$

The updates to the process inputs may then be determined by the actor model 312 as follows:

$$y_+ = A(x) + M_+^+(x, z, w, y) + b_+$$

$$x_0 = \mathrm{argmin}_x(C(y_+, x))$$

$$x_+ = x_-(1 - \alpha_x) + x_0\alpha_x$$

In the above equations, x indicates process inputs, y indicates metrology values (either measured metrology values 308 or predicted metrology values 306), z indicates the trace statistic values and exogenous values (which may be concatenated or combined in any other suitable fashion), w indicates the apriori values, and b indicates an offset term. M indicates the metrology forecast model 316, and A indicates the invertible process model 314. The "+" subscript indicates the next run, and the "−" subscript indicates the current run. When the subscripts/superscripts are omitted, it is implied that all previous data of that type are considered. For example, in the current run metrology forecast model 316 (M.) calls, the y denotes measured metrology values 208 or predicted metrology values 306 from earlier runs, in order to calculate the predicted metrology values 306 for the current run. The "0" subscript denotes a temporary value before regularization is applied.

The "−" superscript for M indicates the prediction used to generate the recipe 302 for the current run (a "previous iteration" of the actor model 312). The "+" superscript for M indicates the prediction used to generate the updates to the recipe 302 for the next run (a "subsequent iteration" of the actor model 312). Thus, $M_+^-$ indicates the next run predicted metrology values 306 from the metrology forecast model 316 using data available during the previous iteration, $M_-^+$ indicates the current run predicted metrology values 306 using all available data during the subsequent iteration, and $M_+^+$ indicates the next run predicted metrology values 306 using all data available for the subsequent iteration. (a indicates a regularization parameter, and C indicates the cost function discussed above.

First, the offset parameter is updated based on metrology values from the current run—either measured metrology values 308 or predicted metrology values 306. A regularization parameter (α) is applied to the offset b update. Typically, the ca parameter has a value between 0 and 1, with 0 indicating no update of the offset, and 1 indicating no memory of prior offset. Typically, the α parameter for measured metrology values 308 will be higher than the one used for predicted metrology values 306.

After the offset is updated, the updates to the recipe 302 (x) are determined by minimizing the cost function. The updated recipe 302 is also regularized using an alpha parameter before being used in the next run. In some embodiments, the α parameters may be set using cross-validation in simulated experiments using historical data in coordination with an inferred process model. The actor model 312 may be initially trained using a marathon-style dataset using results from previously trained process models 314 and metrology forecast models 316.

Returning to FIG. 7, at block 718, the process control engine 622 transmits instructions based on the updated recipe 302 to the control system 110 to perform a subsequent run of the semiconductor manufacturing process. By using the techniques described above to determine the updated recipe 302, the output wafers 304 of the subsequent run will have characteristics closer to desired output characteristics than if the techniques were not used, thus providing run-to-run process control that improves the quality of the output of the manufacturing system 102.

The method 700 then proceeds to decision block 720, where a determination is made regarding whether the method 700 should continue to again adjust the recipe after the subsequent run. The determination may be based on any suitable factor, such as a user input, a maximum time period or number of runs, or any other suitable factor. Typically, the method 700 may continue indefinitely while the recipe 302 (or updated versions thereof) is used to control the manufacturing system 102. If it is determined that the method 700 should continue, then the result of decision block 720 is YES, and the method 700 returns to block 706 to analyze the subsequent run of the semiconductor manufacturing process. Otherwise, if it is determined that the method 700 should not continue, then the result of decision block 720 is NO, and the method 700 advances to an end block and terminates.

While the above techniques are effective in providing optimizations for recipes 302 on a run-to-run basis, performance of the trained metrology forecast model 316, process model 314, and actor model 312 may drift from the actual performance of the manufacturing system 102 over time. As such, the process model 314, metrology forecast model 316, and actor model 312 may periodically be retrained to learn from new data that has been generated. The process model 314 may be retrained when variance in independent input space exceeds a threshold set proportional to known model parameter uncertainty. The metrology forecast model 316 may be retrained when measured metrology values 308 are obtained. When the measured metrology values 308 is received, a new candidate metrology forecast model 316 may be proposed, and the performance of the new candidate metrology forecast model 316 may be automatically evaluated using a simulation of "what if" control scenarios using the process model 314. The metrology forecast model 316 having the best evaluation metrics may be accepted for further use. The alpha parameters of the actor model 312 may also be re-tuned periodically based on a predetermined frequency that is typically less frequent than the updates to the metrology forecast model 316.

In some embodiments, retraining the process model 314 may include characterizing (or recharacterizing) the manufacturing system 102 in order to accurately model its performance. Even if the manufacturing system 102 has been previously characterized, it may be desirable to recharacterize the manufacturing system 102 prior to controlling a new recipe 302, since a new recipe 302 may use a different area of the input parameter space than previously controlled recipes 302, and the manufacturing system 102 may have different response characteristics in this different area.

Process characterization can be an expensive process, as it typically involves running a number of wafers through the manufacturing system 102 using combinations of settings to independently assess the impact of each process input on output wafers 304. That said, it has been discovered that data stored in the historical data store 624, such as data generated by trace sensors 106, exogenous sensors 104, metrology systems 114, and other sources generated while processing different recipes for other products, using different manufacturing devices 108, or using the same manufacturing devices 108 prior to a significant configuration change event, can be reused to help reduce the amount of wafers to be used to recharacterize the manufacturing system 102 to update the process model 314.

In some embodiments, Bayesian parameter estimation may be used with intelligent sampling to minimize a number of wafers to be processed by the manufacturing system 102 in order to obtain a reasonable accuracy in training of the process model 314. This is facilitated by collecting data in various batches that include data from the historical data store 624 in order to minimize the number of new wafers processed for recharacterization.

Figure 9:
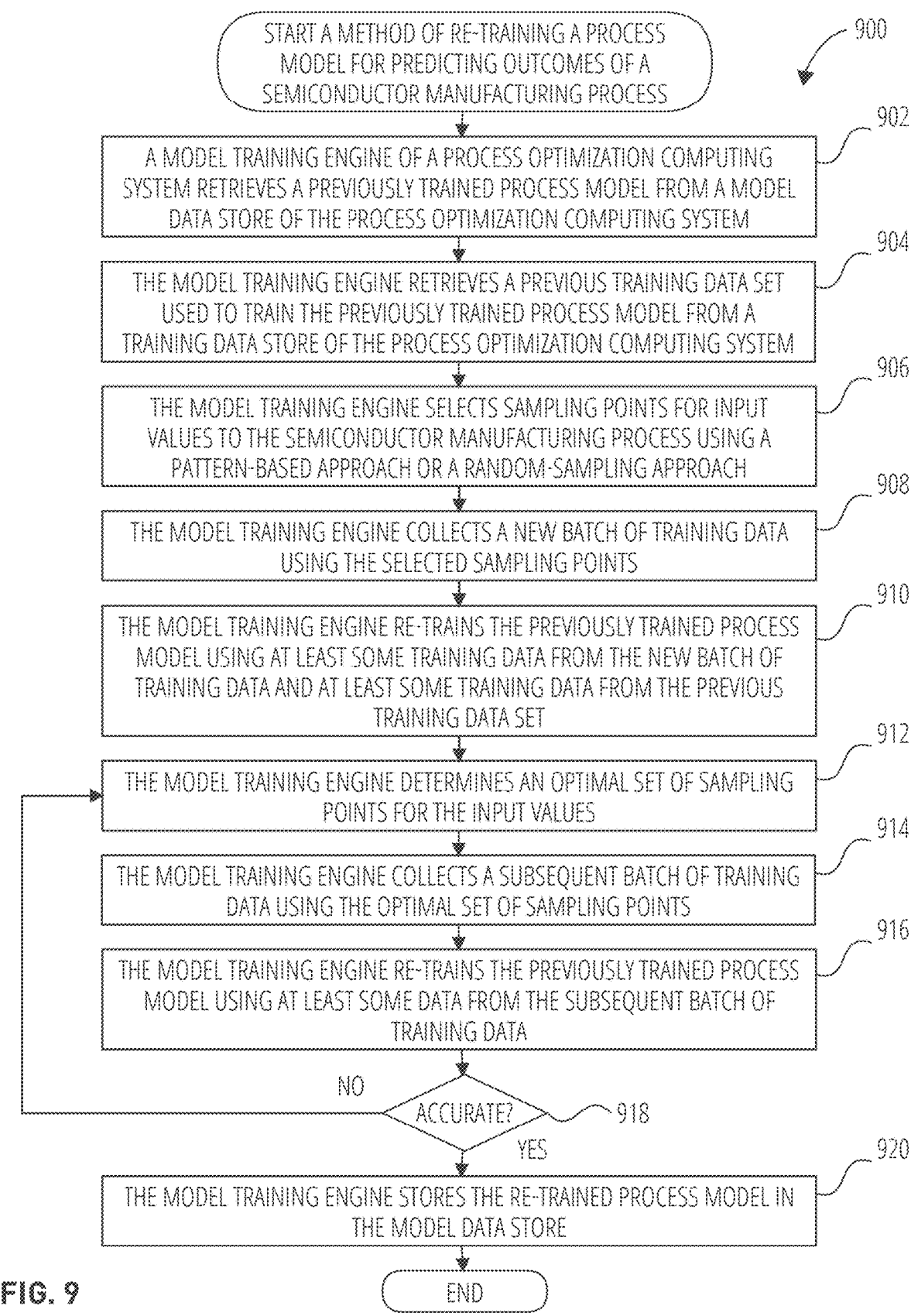
FIG. 9 is a flowchart illustrating a non-limiting example embodiment of a method of re-training a process model for predicting outcomes of a semiconductor manufacturing process, according to various aspects of the present disclosure.

FIG. 9 is a flowchart illustrating a non-limiting example embodiment of a method of re-training a process model for predicting outcomes of a semiconductor manufacturing process, according to various aspects of the present disclosure. From a start block, the method 900 proceeds to block 902, where a model training engine 620 of a process optimization computing system 112 retrieves a previously trained process model from a model data store 608 of the process optimization computing system 112.

At block 904, the model training engine 620 retrieves a previous training data set used to train the previously trained process model from a training data store 612 of the process optimization computing system 112. In some embodiments, instead of limiting the retrieved data to training data, the model training engine 620 may retrieve any data from the historical data store 624 that is associated with the recipe 302 used to generate the data and may therefore be used for training a process model 314.

At block 906, the model training engine 620 selects sampling points for input values to the semiconductor manufacturing process using a pattern-based approach or a random-sampling approach. In some embodiments, the pattern-based approach may be the design of experiments (DOE) approach described in further detail above.

At block 908, the model training engine 620 collects a new batch of training data using the selected sample points. The new batch of training data may be collected by generating one or more recipes 302 that represent the selected sample points, providing instructions to the manufacturing system 102 based on the one or more recipes 302 to create output wafers 304, and using the metrology system 114 to generate measured metrology values 208 for the output wafers 304.

At block 910, the model training engine 620 re-trains the previously trained process model using at least some training data from the new batch of training data and at least some training data from the previous training data set. Similar techniques may be used to re-train the process model as those discussed above for the initial training, but using at least some data from this new batch of training data.

At block 912, the model training engine 620 determines an optimal set of sampling points for the input values. In some embodiments, a machine learning technique may be used to determine the optimal set of sampling points to gain the greatest possible information by analyzing a difference in prior or posterior parameter estimates.

At block 914, the model training engine 620 collects a subsequent batch of training data using the optimal set of sampling points, and at block 916, the model training engine 620 re-trains the previously trained process model suing at least some data from the subsequent batch of training data.

The method 900 then proceeds to decision block 918, where a determination is made regarding whether the accuracy of the re-trained process model 314 has reached a desired level. By using the machine learning technique to determine the optimal set of sampling points to gain the greatest possible information in each iteration, the number of iterations until the desired level of accuracy is reached is minimized. If the desired level of accuracy has not yet been reached, then the result of decision block 918 is NO, and the method 900 returns to block 912 to gather training data from further sampling points.

Otherwise, if the level of accuracy of the re-trained process model 314 is acceptable, then the result of decision block 918 is YES, and the method 900 proceeds to block 920, where the model training engine 620 stores the re-trained process model in the model data store 608. The method 900 then proceeds to an end block and terminates.

Figure 10:
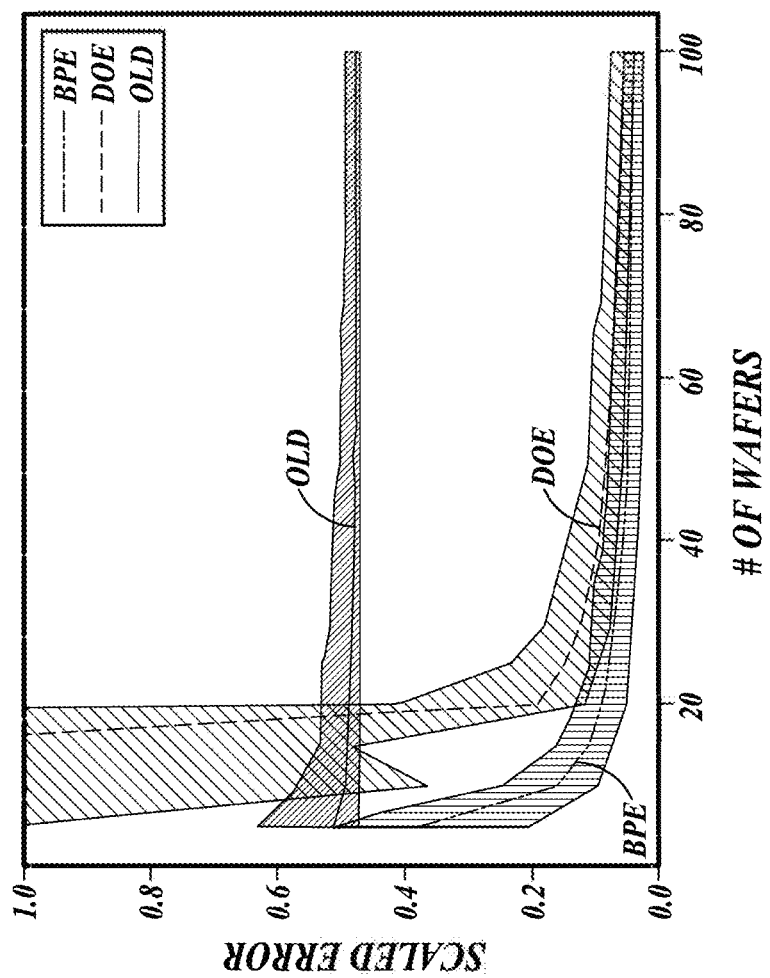
FIG. 10 and FIG. 11A-FIG. 11B illustrate the results of applying Bayesian parameter estimation with random sampling of run points.
Figure 11A:
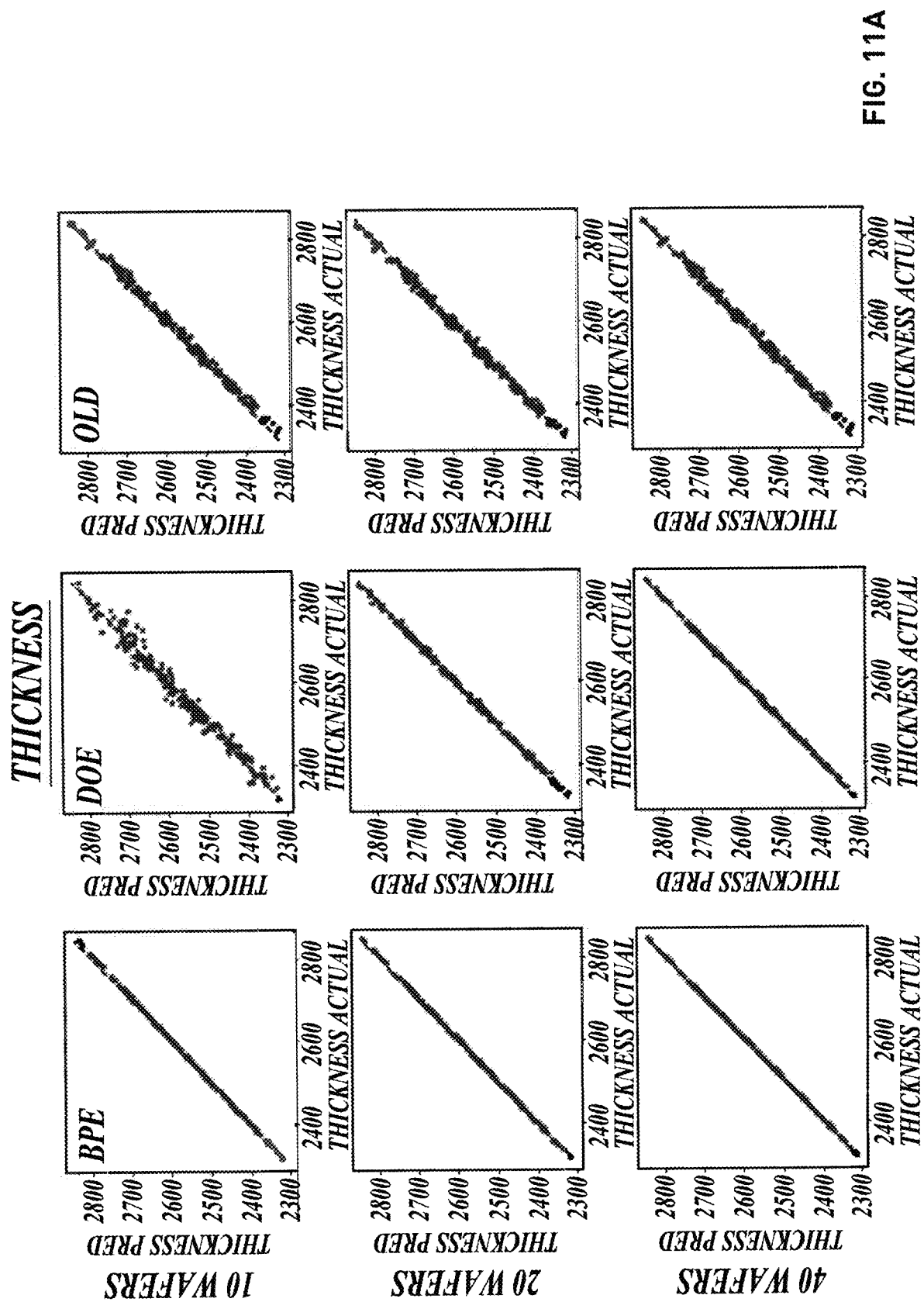
Figure 11B:
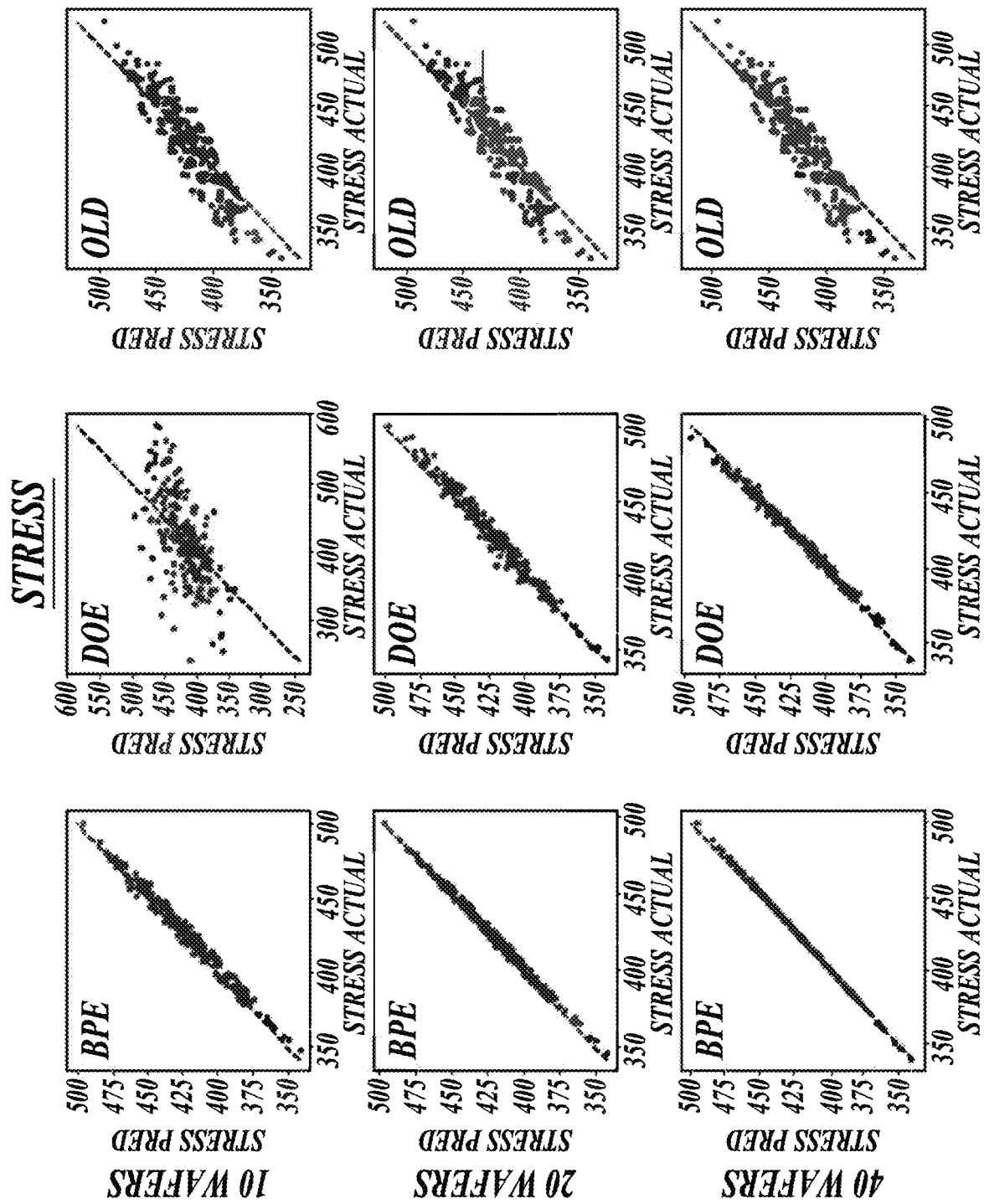

FIG. 10 and FIG. 11A-FIG. 11B illustrate the results of applying Bayesian parameter estimation with random sampling of run points. In FIG. 10, the y-axis represents the mean scaled error for two outputs in a four input, two output process. The x-axis represents the number of wafers (batch size=5, first batch=10). The lines represent the proposed Bayesian parameter estimation (BPE) technique, along with the results of training the process model 314 on just new data (DOE), and using the previously trained process model 314 but fitting an offset term (Old). Each technique was simulated 100 times, and the 5th to 95th percentile error values are represented by the shaded ranges.

In FIG. 11A and FIG. 11B, predicted versus actual thickness results (FIG. 11A) and predicted versus actual stress results (FIG. 11B) are shown using the learned process model 314 based on these three methods (the model with the median error is used). The BPE approach is illustrated to provide superior performance when compared to the DOE and Old approaches, particularly for the stress output at 10 and 20 wafer dataset sizes.

In some embodiments, the process model 314 described above may have inherent uncertainty in the model parameters. This uncertainty may propagate to control error in the updated recipes 302/process inputs, since steps in the process input space may induce a change in the output space that is not precisely correct. In some embodiments of the present disclosure, interactive techniques are used that incorporate probabilistic machine learning models to quantify uncertainty in the process model 314 predictions dependent on certain parameters. Another model may then be used to define an optimal sampling regime to collect new data to minimize uncertainty. the objective of this technique may not be to inherently minimize uncertainty in model parameters, but to minimize the impact of that uncertainty. As such, an objective of the technique may be to minimize the uncertainty in the parameters that have the greatest impact on control decisions. Data may be collected in a batch-by-batch manner, and with each iteration, the modeled uncertainty may be updated. The sampling model may propose the next batch of sample points to further reduce the impact of uncertainty. The process may continue until the uncertainty in the process model 314 is acceptable.

While illustrative embodiments have been illustrated and described, it will be appreciated that various changes can be made therein without departing from the spirit and scope of the invention.

EXAMPLES

The following numbered examples describe non-limiting example embodiments of the present disclosure.

Example 1. A computer-implemented method of controlling a semiconductor manufacturing process, the method comprising: generating, by a computing system, predicted metrology values for a current run and a next run by providing metrology forecast inputs to a metrology forecast model; and generating, by the computing system, an updated recipe for executing at least one semiconductor manufacturing process step using the predicted metrology values for the current run and the next run.

Example 2. The computer-implemented method of Example 1, further comprising: using the updated recipe to control the at least one semiconductor manufacturing process step.

Example 3. The computer-implemented method of Example 2, wherein the at least one semiconductor manufacturing process step includes at least one of thin film deposition, photolithography, etching, overlay correction, or chemical mechanical planarization.

Example 4. The computer-implemented method of any one of Examples 1-3, wherein providing the metrology forecast inputs to the metrology forecast model includes providing at least one of process input values, trace statistic values, exogenous values, apriori values, or measured metrology values; wherein the process input values include values of control inputs used to control a process step; wherein the trace statistic values include at least one of a scalar metric extracted from a sensor trace or a latent dimension extracted from a sensor trace by a deep neural network autoencoder; wherein the exogenous values include at least one of a timestamp a run started, an ambient temperature, or a relative humidity; wherein the apriori values include at least one of a wafer number, a chamber accumulation counter value, a hot plate identifier, or a measurement value from a previous process step; and wherein the measured metrology values include at least one of a thickness, a stress, a refractive index, or an etch critical dimension.

Example 5. The computer-implemented method of any one of Examples 1-4, wherein generating the updated recipe for executing the at least one semiconductor manufacturing process step using the predicted metrology values for the current run and the next run includes: using an actor model to generate the updated recipe based on the predicted metrology values for the current run and the next run.

Example 6. The computer-implemented method of Example 5, further comprising retraining alpha parameters of the actor model after a predetermined period of time or a predetermined number of runs.

Example 7. The computer-implemented method of any one of Examples 5-6, wherein using the actor model to generate the updated recipe based on the predicted metrology values for the current run and the next run includes: providing process model inputs to a process model to determine predicted process outputs; and evaluating the predicted process outputs and the predicted metrology values for the current run and the next run using a cost function to determine the updated recipe.

Example 8. The computer-implemented method of Example 7, wherein the process model inputs include one or more of a deposition time value, a high frequency (HF) power value, an argon flow value, a pedestal gap value, a dosing value, an etch time value, or an etch gas flow value.

Example 9. The computer-implemented method of any one of Examples 7-8, wherein the process model is linearized about an operating point in a space of the process inputs.

Example 10. The computer-implemented method of any one of Examples 7-9, wherein output of the process model includes a prediction for each output dimension within a space of the input values.

Example 11. The computer-implemented method of any one of Examples 7-10, further comprising retraining the process model in response to determining that a variance in an independent input space exceeds a threshold variance proportional to known model parameter uncertainty.

Example 12. The computer-implemented method of any one of Examples 1-11, further comprising retraining the metrology forecast model in response to obtaining measured metrology values.

Example 13. A non-transitory computer-readable medium having computer-executable instructions stored thereon that, in response to execution by one or more processors of a computing system, cause the computing system to perform actions as recited in any one of Examples 1-12.

Example 14. A computing system comprising at least one computing device, wherein the computing system is configured to perform actions as recited in any one of Examples 1-12.

Example 15. A semiconductor manufacturing system controlled using a method as recited in any one of Examples 1-12.

Example 16. A computer-implemented method of re-training a process model for predicting outcomes of a semiconductor manufacturing process, the method comprising: obtaining, by a computing system, a previously trained process model and a training data set used to train the previously trained process model; collecting, by the computing system, a first batch of training data by selecting sampling points for input values using a pattern-based approach or a random-sampling approach; re-training, by the computing system, the previously trained process model using at least some data from the first batch of training data and at least some data from the training data set used to train the previously trained process model; determining, by the computing system, an optimal set of subsequent input value sample points; collecting, by the computing system, a subsequent batch of training data using the optimal set of subsequent input value sample points; and re-training, by the computing system, the previously trained process model using at least some data from the subsequent batch of training data.

Example 17. The computer-implemented method of Example 16, wherein determining the optimal set of subsequent input value sample points includes: analyzing a difference in prior or posterior parameter estimates to determine the optimal set of subsequent input value sample points for gaining a greatest possible information.

Example 18. The computer-implemented method of Example 17, wherein analyzing the difference in the prior or posterior parameter estimates to determine the optimal set of subsequent input value sample points includes applying Bayesian parameter estimation with random sampling of run points.

Example 19. The computer-implemented method of any one of Examples 16-18, wherein determining the optimal set of subsequent input value sample points includes: using a probabilistic machine learning model to quantify uncertainty in outputs of the previously trained process model dependent on identified parameters; and using a second machine learning model to determine the optimal set of subsequent input value sample points to minimize the uncertainty.

Example 20. A non-transitory computer-readable medium having computer-executable instructions stored thereon that, in response to execution by one or more processors of a computing system, cause the computing system to perform actions as recited in any one of Example 16 to Example 19.

Example 21. A computing system comprising at least one computing device, wherein the computing system is configured to perform actions as recited in any one of Example 16 to Example 19.

The embodiments of the invention in which an exclusive property or privilege is claimed are defined as follows:

1. A computer-implemented method of controlling a semiconductor manufacturing process, the method comprising:
   generating, by a computing system, predicted metrology values for a current run and predicted metrology values for a next run by providing metrology forecast inputs associated with the current run to a metrology forecast model;
   providing, by the computing system, at least the predicted metrology values for the current run and the next run to an actor model to generate an updated recipe for executing at least one semiconductor manufacturing process step; and
   using the updated recipe to control at least one manufacturing device during the at least one semiconductor manufacturing process step.

2. The computer-implemented method of claim 1, wherein the at least one semiconductor manufacturing process step includes at least one of thin film deposition, photolithography, etching, overlay correction, or chemical mechanical planarization.

3. The computer-implemented method of claim 1, wherein providing the metrology forecast inputs associated with the current run to the metrology forecast model includes providing at least one of process input values, trace statistic values, exogenous values, apriori values, or measured metrology values;
   wherein the process input values include values of control inputs used to control a process step;
   wherein the trace statistic values include at least one of a scalar metric extracted from a sensor trace or a latent dimension extracted from the sensor trace by a deep neural network autoencoder;
   wherein the exogenous values include at least one of a timestamp of a run started, an ambient temperature, or a relative humidity;
   wherein the apriori values include at least one of a wafer number, a chamber accumulation counter value, a hot plate identifier, and a measurement value from a previous process step; and
   wherein the measured metrology values include at least one of a thickness, a stress, a refractive index, or an etch critical dimension.

4. The computer-implemented method of claim 1, further comprising retraining alpha parameters of the actor model after a predetermined period of time or a predetermined number of runs.

5. The computer-implemented method of claim 1, wherein providing at least the predicted metrology values for the current run and the next run to the actor model to generate the updated recipe includes:
   providing process model inputs to a process model to determine predicted process outputs; and
   evaluating the predicted process outputs and the predicted metrology values for the current run and the next run using a cost function to determine the updated recipe.

6. The computer-implemented method of claim 5, wherein the process model inputs include one or more of a deposition time value, a high frequency (HF) power value, an argon flow value, a pedestal gap value, a dosing value, an etch time value, or an etch gas flow value.

7. The computer-implemented method of claim 5, wherein the process model is linearized about an operating point in a space of the process model inputs.

8. The computer-implemented method of claim 5, wherein output of the process model includes a prediction for each output dimension within a space of the process model inputs.

9. The computer-implemented method of claim 5, further comprising retraining the process model in response to determining that a variance in an independent input space exceeds a threshold variance proportional to known model parameter uncertainty.

10. The computer-implemented method of claim 1, further comprising retraining the metrology forecast model in response to obtaining measured metrology values.

11. A non-transitory computer-readable medium having computer-executable instructions stored thereon that, in response to execution by one or more processors of a computing system, cause the computing system to perform actions for controlling a semiconductor manufacturing process, the actions comprising:
   generating, by the computing system, predicted metrology values for a current run and predicted metrology values for a next run by providing metrology forecast inputs associated with the current run to a metrology forecast model;
   providing, by the computing system, at least the predicted metrology values for the current run and the next run to an actor model to generate an updated recipe for executing at least one semiconductor manufacturing process step; and
   using the updated recipe to control at least one manufacturing device during the at least one semiconductor manufacturing process step.

12. The non-transitory computer-readable medium of claim 11, wherein providing the metrology forecast inputs associated with the current run to the metrology forecast model includes providing at least one of process input values, trace statistic values, exogenous values, apriori values, or measured metrology values;
   wherein the process input values include values of control inputs used to control a process step;
   wherein the trace statistic values include at least one of a scalar metric extracted from a sensor trace or a latent dimension extracted from the sensor trace by a deep neural network autoencoder;
   wherein the exogenous values include at least one of a timestamp a run started, an ambient temperature, or a relative humidity;
   wherein the apriori values include at least one of a wafer number, a chamber accumulation counter value, a hot plate identifier, and a measurement value from a previous process step; and
   wherein the measured metrology values include at least one of a thickness, a stress, a refractive index, or an etch critical dimension.

13. The non-transitory computer-readable medium of claim 11, wherein providing at least the predicted metrology values for the current run and the next run to the actor model to generate the updated recipe includes:
   providing process model inputs to a process model to determine predicted process outputs; and
   evaluating the predicted process outputs and the predicted metrology values for the current run and the next run using a cost function to determine the updated recipe.

14. The non-transitory computer-readable medium of claim 13, wherein the process model inputs include one or more of a deposition time value, a high frequency (HF) power value, an argon flow value, a pedestal gap value, a dosing value, an etch time value, or an etch gas flow value.

15. The non-transitory computer-readable medium of claim 13, wherein the process model is linearized about an operating point in a space of the process model inputs.

16. The non-transitory computer-readable medium of claim 13, wherein output of the process model includes a prediction for each output dimension within a space of the process model inputs.

17. The non-transitory computer-readable medium of claim 13, wherein the actions further comprise retraining the process model in response to determining that a variance in an independent input space exceeds a threshold variance proportional to known model parameter uncertainty.

18. The non-transitory computer-readable medium of claim 11, wherein the at least one semiconductor manufacturing process step includes at least one of thin film deposition, photolithography, etching, overlay correction, or chemical mechanical planarization.

19. The non-transitory computer-readable medium of claim 11, wherein the actions further comprise retraining alpha parameters of the actor model after a predetermined period of time or a predetermined number of runs.

20. The non-transitory computer-readable medium of claim 11, wherein the actions further comprise further comprising retraining the metrology forecast model in response to obtaining measured metrology values.

* * * * *